INVENTORS:
WALTER BÜTOW
MARTIN THEIS

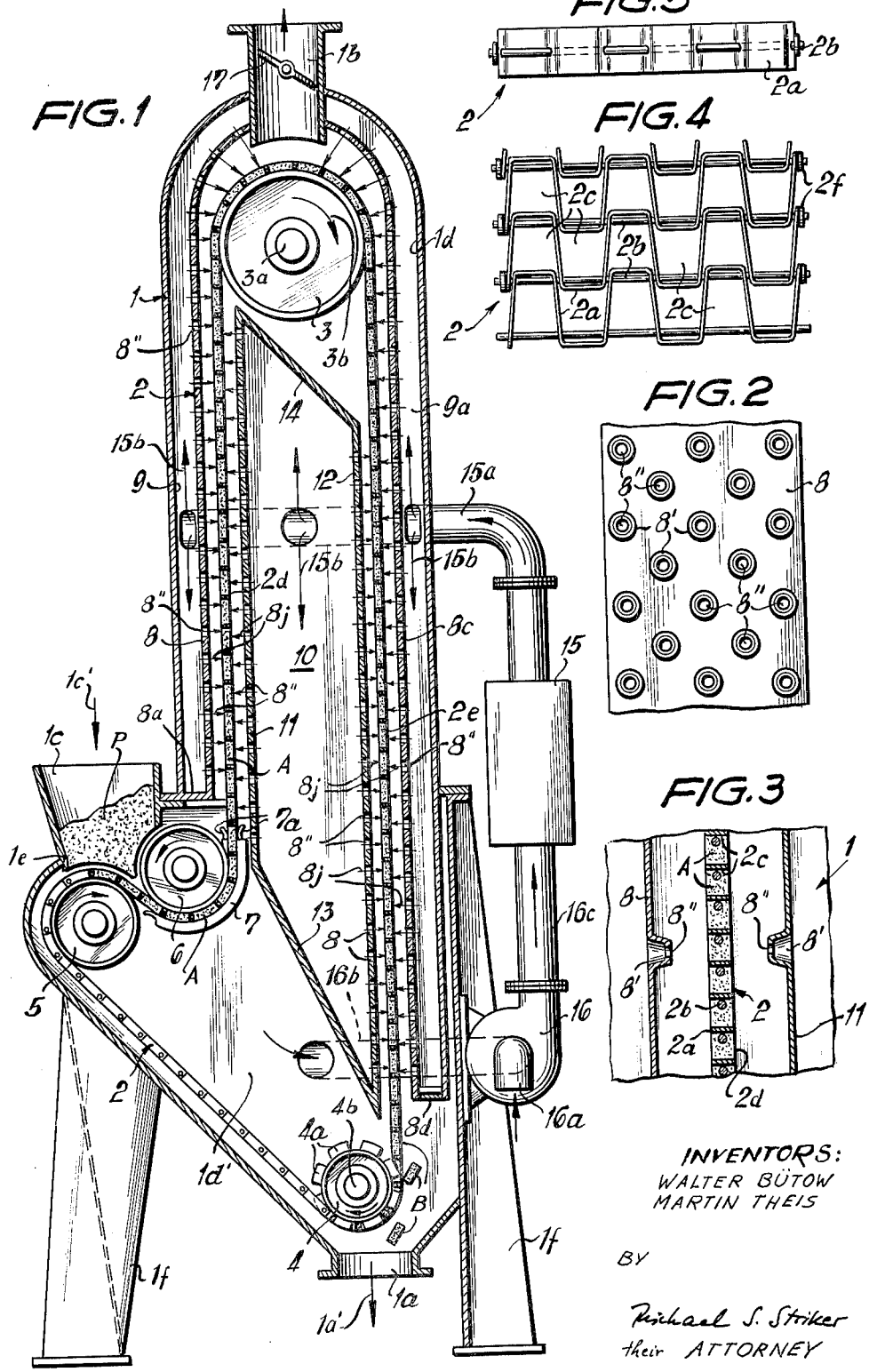

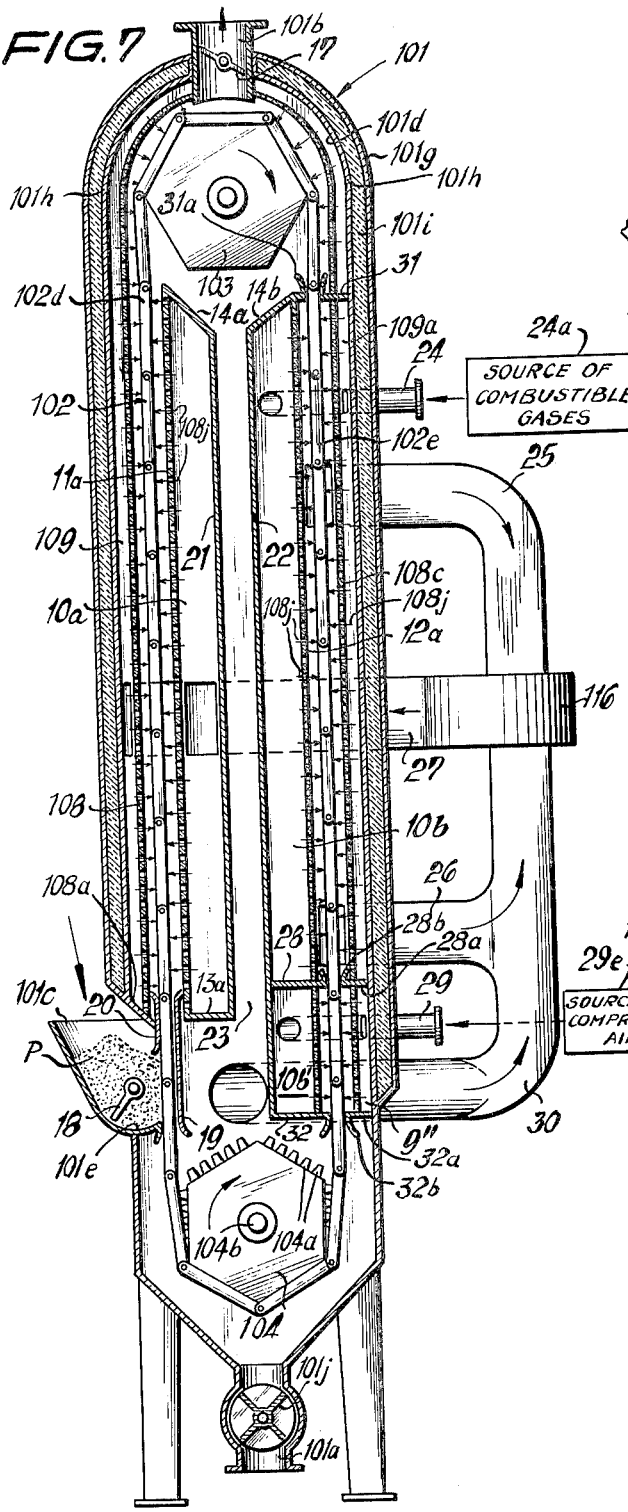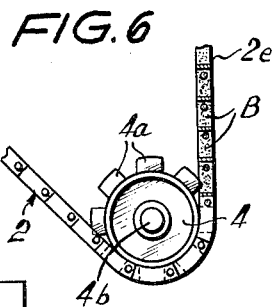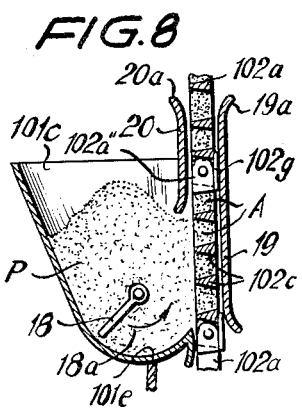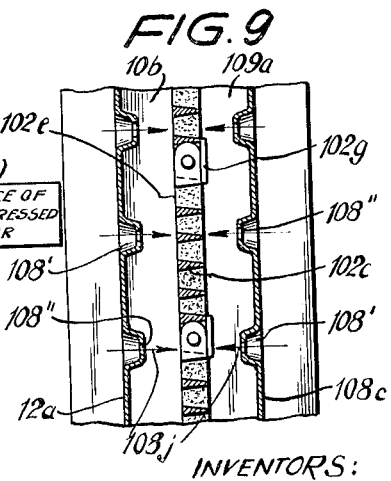
INVENTORS:
WALTER BÜTOW
MARTIN THEIS
BY Richard J. Striker
their ATTORNEY June 28, 1966 W. BÜTOW ETAL 3,257,685
METHOD OF AND APPARATUS FOR THE PRODUCTION
OF BRIQUETTE-LIKE SHAPED ARTICLES
Filed May 31, 1962 3 Sheets-Sheet 3

BY

Michael S. Striker
their ATTORNEY 3,257,685
METHOD OF AND APPARATUS FOR THE PRODUCTION OF BRIQUETTE-LIKE SHAPED ARTICLES
Walter Bütow, Grevenbroich, and Martin Theis, Wevelinghoven, Germany, assignors to Maschinenfabrik Buckau R. Wolf Aktiengesellschaft, Grevenbroich, Germany
Filed May 31, 1962, Ser. No. 199,096
Claims priority, application Germany, May 30, 1961, M 49,208
13 Claims. (Cl. 18—4)

The present invention relates to the production of shaped articles in general, and more particularly to a method of and to an apparatus for the production of briquettes and similar shaped articles which are obtained by molding and drying of moisture-containing plastic substances of pulpy, slimy, silty, slushy or like consistency.

In many branches of chemical, mining, food-processing, metallurgical and certain other industries, waste products or byproducts in the form of mud, scum, slime, mire, silt, sediment, pulp, slurry, slush, granulae, powder or the like must be reprocessed or conveyed to storing or dumping facilities in the form of shaped articles, such as briquettes, pellets and the like. One reason for transforming such plastic materials into coherent shaped articles is that shaped articles are much less likely to produce dust which is highly undesirable in many industries not only because dust contaminates the air but also because it could produce highly explosive mixtures with resultant danger to the safety of the workmen and because the dust might contain valuable ingredients which are worth recovering.

For example, iron-containing dust which develops in metallurgical plants often mixes with water to form a pulpy or slushy mass which, before the metallic ingredient can be separated therefrom, must be filtered to remove the major percentage of water, whereupon the still wet mass is dried to remove the remainder of the moisture. Specially constructed treating, feeding and other apparatus, such as kneaders, extruders, etc., are necessary to process this hard-to-handle mass and to continuously advance the mass at a uniform rate to a dryer. While passing through the drying apparatus (e.g., a rotary drying kiln, a band dryer, a multi-stage dryer or an air dryer), the mass either disintegrates into irregularly configured particles with a high percentage of dust or is totally pulverized owing to constant friction during forward movement toward and/or through the drying apparatus. Therefore, it is necessary to provide special dust collecting apparatus which prevent the dust from returning to the plant with resultant losses in metal which is contained in the pulverulent material. Before the valuable particulate matter is ready for reprocessing, it must be sifted, ground, wetted, the mixture homogenized, thereupon transformed into granular form, pelletized, briquettized, sintered, fritted, vitrified, clinkered, baked and/or otherwise treated in order to make sure that the final product is of a consistency and shape in which it may be reprocessed without production of dust. Only then is the material ready for smelting so as to recover the valuable ingredients which the originally pulverulent component contains.

The situation is rather similar in digestion and gasification of sewage. The pulpy or slimy starting material which is withdrawn from the rotary filters or from the settling tanks must be transformed into a comparatively solid, coherent, dry, regularly formed and dust-free mass before it can be processed in gas producing apparatus, such as revolving-grate generators and the like. Another example is the processing of lime-containing scum and sediment obtained in the production of sugar. Such byproducts are processed to obtain a valuable fertilizer which must be free of dust and which must be in a condition ready for spraying. A further example is the manufacture of briquettes produced from small pieces and dust developing in transportation and mining of coal. The supply of such dust often exceeds the demand so that, in order to avoid excessive losses, the dust must be processed to assume a more readily utilizable form of pellets, briquettes, blocks, eggs and the like. As is known, briquettes, pellets and like artificially shaped coal-containing products are obtained by mixing coal dust with pitch or another suitable binding material and by compressing the resulting mixture in suitable molds.

An important object of the present invention is to provide an improved method of producing briquettes and like shaped articles from moisture-containing pulpy or slimy plastic substances according to which the plastic substances may be transformed into shaped articles in a very simple and efficient manner without any or with negligible formation of dust.

Another object of the invention is to provide a method of the just outlined characteristics which is equally suited for the production of shaped articles containing particles of mineral, vegetable, organic or inorganic origin, and according to which the plastic material may be transformed into coherent shaped articles within exceptionally short periods of time in a continuous operation and in a very small area without in any way contaminating the plant.

A further object of the invention is to provide a method of producing briquette-like shaped articles according to which certain gaseous byproducts of metallurgical, mining, sugar producing or other operations may be utilized to assist in the production of shaped articles, and according to which unavoidable shrinkage of plastic material during transformation into shaped articles may be put to use to assist in evacuation of shaped articles from the apparatus.

An additional object of the invention is to provide a novel apparatus for the practice of our method wherein the originally plastic material may be transformed into coherent shaped articles in a continuous operation and with negligible formation of dust.

Still another object of the invention is to provide an apparatus of the just outlined characteristics wherein the processed material may be subjected to various treatments in rapid succession so that a single pass through the apparatus is sufficient to transform the originally plastic mass into briquettes, block and like shaped articles.

A concomitant object of the invention is to provide a combined molding and drying apparatus for plastic materials of pulpy, slimy and like consistency which may be rapidly and conveniently converted for processing of different types of plastic material, which may be readily installed and utilized in many branches of chemical, metallurgical and other industries without necessitating any or by necessitating only minimal changes in the construction of other stations in the plant, and which requires very little attention once it is put to use.

With the above objects in view, the invention resides in the provision of a method of transforming moisture-containing plastic materials of pulpy and like consistency into briquette-like shaped articles in the mold cavities of a moving conveyer which includes the steps of consecutively introducing batches of plastic material into the mold cavities so that the batches are pressed into and assume the form of the mold cavities, subjecting the batches of plastic material to direct action of hot gases so as to withdraw moisture from the plastic material and to transform the batches into coherent shaped articles, and ejecting the shaped articles from the mold cavities.

In accordance with a feature of the improved method, the batches of plastic material may be subjected to the action of hot gases while advancing in upward direction along a fully or nearly vertical run of an endless conveyor, and the conveyor may comprise a second substantially vertical run along which the batches of shaped articles are subjected to direct sintering or fritting action of flames and/or to the action of cooling gases before being ejected from the mold cavities.

The improved apparatus comprises an endless band conveyor including a plurality of articulately connected link- or grate-like elements which define in or between themselves a plurality of mold cavities preferable opening into both sides of the conveyor, a source of plastic material, means for consecutively transferring batches of plastic material into the mold cavities of the conveyor, means defining at least one apertured chamber which is adjacent to the conveyor at the downstream side of the material transferring means, a source of hot gases connected with the chamber so that the gases delivered to the chamber are discharged against and withdraw moisture from the advancing batches of plastic material whereby the batches are transformed into shaped articles, and means provided at the downstream side of the chamber for ejecting the shaped articles from the mold cavities.

The entire conveyor is accommodated in an airtight housing which is provided with suitable inlet and outlet means and which may form part of gas-receiving and gas-discharging chamber or chambers. If necessary, one of the chambers may receive combustible gases which are ignited prior to impinging against the batches of plastic material so that the material is subjected to sintering or fritting action of flames, and the apparatus may also comprise one or more coolant receiving chambers which are disposed at the downstream side of the fritting or sintering station to cool the shaped articles before the articles are ejected from the respective mold cavities.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a partly elevational and partly vertical sectional view of an apparatus for the production of briquette-like shaped articles which embodies one form of my invention;

FIG. 2 is a greatly enlarged fragmentary front elevational view of a wall having hollow conical nozzles adapted to direct jets of heated gases against batches of plastic material which are received in and advance with the mold cavities of the endless band conveyor forming part of the apparatus shown in FIG. 1;

FIG. 3 is a greatly enlarged fragmentary vertical section through the conveyor of FIG. 1 and through a pair of apertured walls which are provided with hollow conical gas directing nozzles of the type shown in FIG. 2;

FIG. 4 is an enlarged fragmentary front elevational view of the conveyor;

FIG. 5 is an end view of the structure shown in FIG. 4;

FIG. 6 is a slightly enlarged view of a deflecting roller which forms part of the apparatus shown in FIG. 1 and wihch is provided with teeth serving as a means for ejecting shaped articles from the mold cavities of the conveyor;

FIG. 7 is a partly elevational and partly vertical sectional view of a modified apparatus in which batches of plastic material are subjected to the action of hot and cool gases as well as to direct sintering, fritting or vitrifying action of flames;

FIG. 8 is an enlarged section through a source of plastic material which forms part of the apparatus illustrated in FIG. 7, further showing a portion of a modified conveyer whose elements are formed with differently configurated mold cavities;

FIG. 9 is a fragmentary transverse section through the conveyor of FIG. 7 and through a pair of apertured walls of the type shown in FIG. 3;

Figure 10:
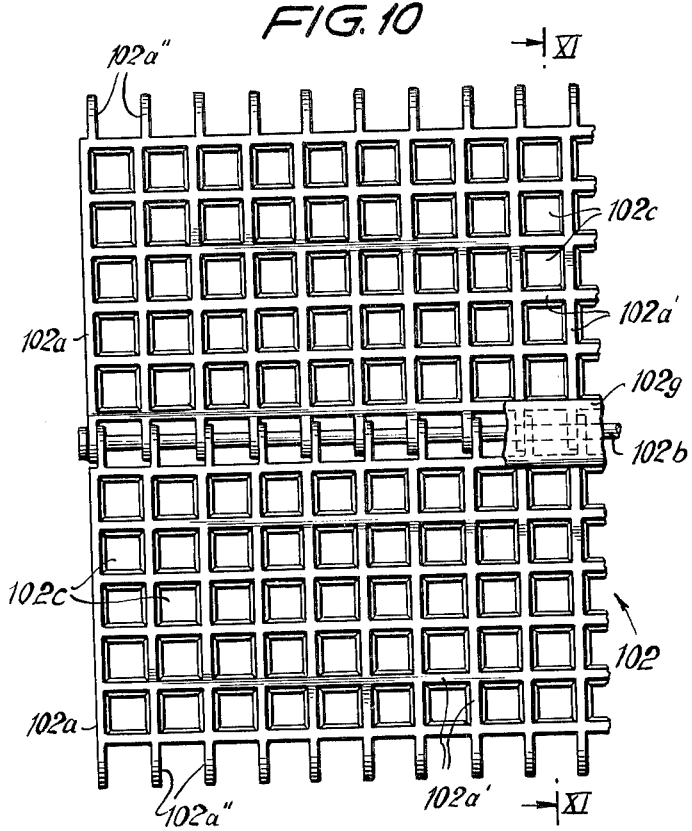
FIG. 10 is a greatly enlarged fragmentary front elevational view of two interconnected grate-like elements which form part of the conveyor shown in FIGS. 7 to 9.
Figure 11:
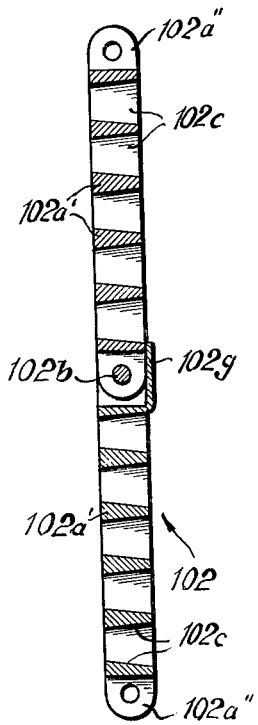
Figure 12:
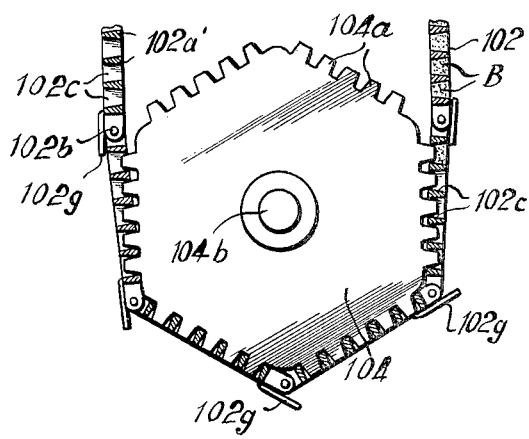

FIG. 11 is a vertical section as seen in the direction of arrows from the line XI—XI of FIG. 10; and FIG. 12 is a greatly enlarged view of a polygonal deflecting roller which forms part of the apparatus shown in FIG. 7 and which is provided with specially configurated and especially arranged teeth adapted to eject shaped articles from the mold cavities of the conveyor elements shown in FIGS. 10 and 11.

Referring now in greater detail to the illustrated embodiments, and first to FIG. 1, there is shown an apparatus for the production of briquettes B or similar shaped articles which comprises a housing 1 defining an internal space 1d for an endless band conveyor 2. The housing 1 is formed with an inlet 1e which receives a source 1c of plastic material P, e.g. a trough or hopper, and the open inner end of this hopper 1c is adjacent to a material transferring means which includes a pair of band deflecting and material feeding rollers 5, 6 and an arcuate shield 7 which is adjacent to a portion of the roller 6 so as to define with the latter an arcuate path for the link-shaped elements 2a of the conveyor 2 (see FIGS. 4 and 5). The rollers 5, 6 are arranged in such a way that they impart to the portion of the conveyer 2 which passes thereabout an S-shaped configuration because the conveyor travels about the upper portion of the roller 5 and thereupon about the lower portion of roller 6 and along the path defined by the roller 6 with the aforementioned shield 7. At the downstream side of the roller 6, the shield 7 is provided with a pair of spaced diverging lips 7a whose mutual distance equals the desired thickness of the shaped articles B which are being formed in the mold cavities 2c defined by the elements 2a (see FIG. 4). It will be noted that the inlet 1e is adjacent to the lower portion of the left-hand vertical run 2d of the conveyer 2, and this run 2d extends between the lips 7a and upper deflecting roller 3 whose shaft 3a is mounted in the housing 1. This shaft 3a may but need not constitute the means for driving the conveyor in clockwise direction which is indicated by the arrow 3b so that the mold cavities 2c moving along the run 2d advance in upward direction from the inlet 1e toward and about the roller 3 to thereupon descend along a second vertical run 2e forming part of the conveyor 2. This second run 2e extends between the roller 3 and a second deflecting roller 4 which is mounted in the lower portion 1d′ of the internal space 1d and which is provided with teeth 4a serving as a means for ejecting shaped articles B from the mold cavities 2c so that the articles may be evacuated through a first outlet 1a in the direction indicated by the arrow 1a′. It will be noted that the outlet 1a is located in the lower-most portion of the housing 1 so that the article B may be evacuated by gravity. If desired, the outlet 1a may be provided with a suitable air lock, not shown. The uppermost portion of the housing 1 is provided with a tubular second outlet 1b which is located above the roller 3 and whose passage is controlled by a turnably mounted valve 17. The purpose of the second outlet 1b is to permit controlled evacuation of some or all moisture-containing spent gases from the internal space 1d.

The housing 1 accommodates or comprises a short horizontal wall 8a which is adjacent to the inlet 1e, and a vertical wall 8 which extends from the wall 8a to the second outlet 1b so as to define in the housing a chamber 9 which is adjacent to the left-hand side of the conveyor run 2d. The wall 8 is formed with a plurality of preferably uniformly spaced apertures or orifices 8", and this wall is directly adjacent to the run 2d. As shown in FIGS. 2 and 3, the wall 8 may be formed with nozzles 8', and the orifices 8" are then provided in the tips of these nozzles so as to be in rather close proximity of the run 2d.

A second chamber 10 is located between the runs 2d, 2e and is formed by a pair of spaced apertured vertical walls 11, 12, by an inclined upper wall 14, and by an inclined lower wall 13. The walls 11, 12 are formed with orifices or apertures 8" in the same way as the wall 8, and these walls 11, 12 are respectively adjacent to the runs 2d, 2e.

A third chamber 9a is provided along the right-hand side of the conveyer run 2e. This third chamber is bounded by a portion of the tubular outlet 1b, by an apertured wall 8c which is closely adjacent to the run 2e, by a horizontal lower wall 8d, and by a portion of the housing 1. The wall 8c is provided with apertures or orifices 8".

The chambers 9, 9a and 10 communicate with a supply conduit 15a which is connected to the discharge end of a source of heated gases, e.g. a gas burner 15, the latter located externally of the housing 1 and adapted to deliver heated gases through the conduit 15a so that the gases enter the chambers 9, 9a and 10 in directions indicated by the arrows 15b. At least some spent gases may be withdrawn from the space 1d by a pump or fan 16 whose suction side is connected with the lowermost portion 1d' of the space 1d by a conduit 16b and whose pressure side delivers spent gases to the burner 15 through a further conduit 16c. In addition, the fan 16 draws atmospheric air through an intake nipple 16a so as to compensate for the loss of spent gases which might be evacuated through the outlet 1b if the valve 17 is at least partially open.

The housing 1 is supported by legs 1f one of which may serve as a carrier for the fan 16.

The construction of the conveyer 2 is shown in greater detail in FIGS. 4 and 5. This conveyer consists of substantially zig-zag shaped elements or links 2a made of sheet metal and formed with aligned bores for connecting rods 2b extending transversely of the conveyer and provided with suitable washers or nuts 2f to prevent axial displacements of these rods when the conveyer is in actual use. The links 2a define themselves identically configurated mold cavities 2c each of which receives a bath A of plastic material P while advancing from the roller 5 to the roller 6.

The method of forming shaped articles B in the apparatus of FIG. 1 is carried out as follows:

The hopper 1c is assumed to contain a supply of plastic material P which descends by gravity onto that portion of the conveyer 2 which passes between the rollers 5, 6 so that batches A of plastic material enter the mold cavities 2c and fill these cavities while the conveyer passes between the roller 6 and the shield 7. The means for continuously or intermittently conveying plastic material to the hopper 1c (arrows 1c') is not shown in the drawings. The lips 7a and the links 2a impart to the batches A a predetermined shape, i.e. the lips 7a impart to the batches a predetermined thickness which these batches retain while being transformed into shaped articles B on their way along the runs 2d and 2e. The shield 7 assists the roller 6 in pressing the plastic material into and in compacting the material in the mold cavities, and the roller 6 removes from the source 1c only such quantities of plastic material which can be introduced into the momentarily adjacent mold cavities.

The burner 15 discharges a continuous stream of heated gases which pass through the conduit 15a and fill the chambers 9, 9a, 10 by entering in the directions indicated by the arrows 15b. The heated gases are discharged in the form of individual jets 8j by passing through the orifices 8" of the walls 8, 11, 12 and 8c so that the jets 8j impinge at right angles against and withdraw moisture from the batches A while the batches travel along the conveyer runs 2d, 2e whereby the batches are transformed into shaped articles B which are ejected by the teeth 4a of the lower deflecting roller 4 and may drop by gravity through the lower outlet 1a. Spent gases which have transmitted heat to the batches A and which have withdrawn moisture from these batches accumulate in the internal space 1d to be withdrawn by the fan 16 through the conduit 16b and/or to be discharged through the upper outlet 1b. Since the jets 8j of gases discharged through the orifices 8" of the walls 8, 11 come into contact with batches containing high percentages of moisture, the outlet 1b is provided at the downstream side of the run 2d so as to permit evacuation of very moist spent gases. The gases streaming through the orifices 8" of the walls 12, 8c receive less moisture and, after accumulating in the lower portion 1d' of the internal space 1d, such comparatively dry gases are withdrawn through the conduit 16b to be returned into the burner 15 where they are admixed to and are heated by newly formed hot gases so that they may be recirculated through the chambers 9, 9a and 10. The quantities of air drawn through the nipple 16a correspond to quantities of moisture-laden spent gases discharged through the upper outlet 1b.

The shaft 4b of the lower deflecting roller 4 is preferably driven by a suitable motor or the like so that the teeth 4a may perform the dual function of ejecting the shaped articles B and of driving the conveyer 2 in its endless path about the rollers 4, 5, 6 and 3. The peripheries of the rollers 5, 6 and 3 are preferably smooth so as to polish or smoothen the exposed sides of the batches A and to impart to the articles B their characteristic shape.

In a metallurgical plant, the source 15 may assume the form of a reservoir for hot flue gases or for other hot gases which are formed as a byproduct of a metallurgical operation. Alternately, the source 15 may assume the form of a gas burner of any conventional design, or it may consist of a suitable heat exchanger in which a heated gas transmits heat to air drawn through the nipple 16a. In any event, the pressure at which the gases are admitted to the chambers 9, 9a and 10 is preferably such that the jets 8j discharged through the orifices 8" in the walls 8, 11, 12 and 8c produce localized turbulences after impinging against the exposed sides of the batches A to insure that the withdrawal of moisture is completed at the time the shaped articles reach the lower transverse wall 8b. In fact, the outer layers of the batches A are hardened shortly after initial contact with hot gases at a level above the lips 7a so that the batches retain their form during subsequent advance along the runs 2d, 2e. During such advance, the cores of the batches A continuously release moisture because the batches A advance continuously and thereby move into contact with new jets of hot gases which remove moisture from and through the exposed surfaces of the batches so that the withdrawal of moisture and the formation of shaped articles B is completed at the time the articles reach the teeth 4a of the lower roller 4. As a result of shrinkage, the volume of the shaped articles B is smaller than the volume of the batches A so that the shaped articles B can be readily ejected by the teeth 4a because the surfaces of the articles B are already separated from the respective links 2a. The formation of dust is negligible or non-existent since the length of the runs 2d, 2e may be readily selected in such a way that the articles B are evacuated from the housing 1 as soon as they are formed, i.e. as soon as they lose requisite quantities of moisture. Owing to the fact that the hot gases impinge against the exposed surfaces of moving batches of plastic material, they continuously disperse vapors from such exposed surfaces so that the latter are subjected to direct action of jets 8j as the mold cavities 2c advance along the run 2d. Of course, and depending on the nature of the plastic material P, this material may contain smaller or larger percentages of suitable binding and hardening agents, and the nature and percentage of such agents in the plastic material P determines the hardness, cohesiveness, brittleness and certain other characteristics of the ultimate products. For example, the plastic mass may contain additives such as lime, sulphite solution, water glass, sodium chloride, phenolic resins or other binding and/or hardening agents.

It will be readily understood that, in certain instances, the chamber 10 may be replaced by two separate chambers which are respectively adjacent to the runs 2d, 2e, or that one or even two of these chambers may be dispensed with if the nature of plastic material is such that it can lose sufficient moisture while passing along the apertured wall of a single chamber or if only one of the runs 2d, 2e is surrounded by a pair of chambers. Furthermore, suitable valve means may be provided in the conduits 15a, 16b, 16c to regulate the rate of gas flow into and from the chambers 9, 9a and 10 or, alternately, the motor of the fan 16 may be of the variable speed type to thereby regulate the rate at which the heated gases are circulated into moisture-withdrawing contact with the batches A. Since the runs 2d, 2e are preferably disposed in vertical or nearly vertical planes, the danger that shaped articles would drop from the mold cavities before completion of the drying operation is very remote.

FIG. 7 illustrates a modified apparatus which comprises a housing 101 having an outer shell 101g, an inner shell 101h, a layer of heat-insulating material 101i between the shells 101g, 101h, an inlet 101e which is provided in the lower portion of the outer shell 101g and is adjacent to the left-hand vertical run 102d of the endless conveyor 102, a first tubular outlet 101a which is located in the lowermost portion of the housing and is provided with a rotary air lock 101j, and a second tubular outlet 101b whose passage is controlled by an adjustable valve 17.

The conveyor 102 comprises a plurality of gratelike elements 102a which include longitudinally and transversely extending bars 102a' and which are articulately connected by transversely extending rods 102b. Each element 102a defines a plurality of mold cavities 102c which open into both sides of the conveyor and whose cross-sectional areas diminish in a direction from the one to the other side of the conveyor (see FIGS. 9, 10 and 11). The conveyor 102 travels about an upper deflecting roller 103 of polygonal contour and about a similar lower deflecting roller 104 (see FIG. 12) which latter is provided with a plurality of peripheral faces each formed with a number of ejecting teeth 104a, one for each mold cavity 102c in a grate 102a. The rods 102b pass through aligned holes provided in lugs 102a'' of the grates 102a, and these lugs are concealed by cover plates 102g so that these plates prevent penetration of plastic material P between the lugs 102a'' because such material could impede pivotal movements of the grates with respect to each other, particularly after hardening under the action of heating gases to which the material is subjected in the housing 101. As shown in FIG. 8, the mold cavities 102c momentarily adjacent to the inlet 101e diverge toward the source 101c so that the modified material transmitting and feeding element 18 which is located in the source 101c may readily pack the material P under pressure into the mold cavities. On the other hand, when the mold cavities 102c travel about the lower roller 104, they diverge in a direction away from the teeth 104a so that these teeth may readily eject the shaped articles B which latter thereupon drop into the outlet 101a and are evacuated through the lock 101j.

The material transferring and cavity-filling means 18 (FIGS. 7 and 8) assumes the form of a rotary blade which is driven in the direction indicated by the arrow 18a and which kneads the plastic material P in addition to packing the material into the upwardly advancing mold cavities 102c. Each newly filled mold cavity then advances between a pair of plate-like shields 19, 20 which are disposed at the opposite sides of the left-hand vertical run 102d and which smoothen the exposed sides of the batches A. At their upper ends, the shields 19, 20 are provided with diverging lips 19a, 20a which correspond to the lips 7a shown in FIG. 1. It is asumed that the conveyor 102 is driven by the shaft 104b of the lower polygonal roller 104, and that this roller is driven in clockwise direction so that the mold cavities travel upwardly along the left-hand vertical run 102d and downwardly along the right-hand vertical run 102e.

The housing 101 accommodates two pairs of chambers 109, 10a and 109a, 10b which are respectively disposed at the opposite sides of the runs 102d, 102e. The chamber 109 is bounded by the upper outlet 101b, by a lower transverse wall 108a, by a portion of the inner shell 101h, and by a wall 108 which is rather closely adjacent to the left-hand side of the conveyor run 102d and which is provided with inwardly extending hollow conical nozzles similar to nozzles 108' shown in FIG. 9 and having orifices or apertures 108''. The chamber 10a is bounded by a solid vertical wall 21, by an inclined upper wall 14a, by a horizontal lower wall 13a, and by an apertured vertical wall 11a which latter is rather closely adjacent to the right-hand side of the run 102d and is formed with nozzles 108' and orifices 108'' in the same manner as the wall 108. The chamber 10b is bounded by a solid vertical wall 22, by an inclined upper wall 14b, by a horizontal lower wall 28, and by an apertured wall 12a which latter is formed with nozzles 108' and orifices 108'' and is adjacent to the left-hand side of the run 102e. The fourth chamber 109a is bounded by a portion of the inner shell 101h, by the upper outlet 101b, by a horizontal lower wall 28a, and by an apertured wall 108c which is adjacent to the right-hand side of the run 102e and is formed with nozzles 108' and orifices 108'' in a manner as shown in FIG. 9. The chamber 109a accommodates a horizontal partition or wall 31 which is provided with upwardly diverging lips 31a for guiding the elements 102a into that portion of the internal space 101d which extends between the apertured walls 12a and 108c. Similar lips 28b are provided on the lower walls 28 and 28a. The walls 28, 28a respectively constitute the upper end walls of two cooling chambers 10b', 9'' which latter are bounded by the lower portions of the walls, 22, 12a, 108c, by a portion of the inner shell 101h, and by lower horizontal walls 32, 32a, the latter formed with downwardly diverging guide lips 32b.

The purpose of the lips 19a, 20a, 31a, 28b and 32b is to prevent excessive lateral deflections of the conveyer 102 under the action of jets 108j which pass through the apertured walls 108, 11a, 12a and 108c. It will be noted that the walls 21, 22 define between themselves a vertical channel 23 which permits communication of gases between the upper and lower portions of the internal space 101d. The wall 31 may but need not completely divide the chamber 109a into an upper zone extending to the outlet 101b and into a lower zone extending to the wall 28a.

The batches A of plastic material P traveling along the runs 102d, 102e are heated by combustion products and flames of gases which are admitted through a conduit 24 leading to the chambers 10b, 109a. This conduit is connected to a source 24a of combustible gases, and the jets of combustible gases passing through the orifices 108'' of the walls 12a, 108c intermediate the walls 28, 28a and the outlet 101b are ignited so that the batches A descending along the run 102e are subjected to direct fritting or sintering action of flames. The gaseous products of combustion accumulating in the space between the walls 12a, are withdrawn through a pair of spaced return conduits 25, 26 which lead to the suction side of a blower or fan 116, and this blower delivers hot combustion products through a supply conduit 27 which communicates with the chambers 109, 10a so that the jets 108j of hot gases passing through the orifices of the walls 108, 11a withdraw moisture from the batches A ascending along the left-hand run 102d. Spent gases accumulating in the space between the walls 108, 11a flow into the lower and upper portions of the internal space 101d and may be evacuated through the upper outlet 101b to the extent determined by the position of the valve 17. At least some spent gases may also flow through the channel 23 to be returned to the blower 116 through a return conduit 30 which communicates with the lower portion of the internal space 101d and which discharges into the conduit 26.

The cooling chambers 10b' and 9'' receive a coolant, e.g. atmospheric air, through a supply conduit 29 which is connected to a suitable source 29a, e.g. an air compressor or the like. Some coolant will escape from the chambers 10b', 9'' between the lips 32b and will enter the space 101d whence it is drawn through the conduit 30 or is evacuated through the channel 23 and through the upper outlet 101b.

The nozzles 108' of the walls 12a, 108c constitute small gas burners, and these nozzles are sufficiently close to the opposite sides of the run 102e to act directly against the exposed surfaces of the batches A so as to sinter the batches and to insure that the batches are hardened and assume the form of briquettes B at the time they reach the cooling chambers 10b', 9''. For example, the gaseous products of combustion admitted to the chambers 109, 10a may be maintained at a temperature of between 400-600° C., and the temperature of flames emanating from the chambers 110b, 109a may be in the range of 800-1,000° C. The coolant in the chambers 10b', 9'' may reduce the temperature of shaped articles B to about 80° C. before the shaped articles reach the teeth 104a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for the production of briquette-like shaped articles from moisture-containing plastic materials of pulpy and like consistency, comprising an endless band conveyer having a first side, a second side, and a plurality of articulately connected elements, said elements defining material-receiving mold cavities and said cavities open at both sides of said conveyer, said conveyer having at least one substantially vertical run; means for driving said conveyer so that said elements advance in upward direction while moving along said substantially vertical run; a source of plastic material; means provided at the lower end of said run for consecutively transferring batches of plastic material from said source and into said mold cavities; housing means defining a pair of chambers, one at each side of said conveyer, said chambers located at the opposite sides of said substantially vertical run and each thereof having apertured wall means adjacent to the respective side of said conveyer, said housing means completely enclosing said conveyer; a source of hot gases connected with said chambers for delivering hot gases thereto so that the gases are discharged through said apertured wall means to withdraw moisture from the batches of plastic material contained in the mold cavities moving along said run and to transform the batches into shaped articles; and means located at the downstream side of said chambers for ejecting the shaped articles from said mold cavities.

2. An apparatus for the production of briquette-like shaped articles from moisture-containing plastic materials of pulpy, slimy and like consistency, comprising an endless band conveyer having a first side, a second side, and a plurality of articulately connected elements defining material-receiving mold cavities of equal dimensions, said cavities open at both sides of said conveyer and said conveyer having a first and a second substantially vertical run; means for driving said conveyer so that said elements advance in upward direction along said first run and in downward direction along said second run; a source of plastic material; means provided at the lower end of said first run for consecutively transferring batches of plastic material from said source into said mold cavities; housing means defining a first and a second pair of chambers, said first pair of chambers disposed at the opposite sides of said first run and said second pair of chambers disposed at the opposite sides of said second run, each of said chambers having apertured wall means adjacent to the respective run of said conveyer, said housing means completely enclosing said conveyer; a source of hot gases connected with said chambers for delivering hot gases through said apertured wall means to withdraw moisture from the batches of plastic material contained in the mold cavities moving along said runs and to transform the batches into shaped articles; and means located at the lower end of said second run for ejecting the shaped articles from said mold cavities.

3. An apparatus for the production of briquette-like shaped articles from moisture-containing plastic materials of pulpy, slimy and like consistency, comprising a housing defining an internal space and having inlet and outlet means communicating with said space; an endless band conveyer mounted entirely within said housing and having a first side, a second side, at least one substantially vertical run, and a plurality of articulately connected elements defining material-receiving mold cavities, said cavities open at both sides of said conveyer and said substantially vertical run having a lower portion adjacent to said inlet means; means for driving said conveyer so that said elements advance upwardly along said run; a source of plastic material; means for consecutively transferring batches of plastic material from said source and through said inlet means into the mold cavities of said conveyer; means defining a pair of chambers located in said housing means at the opposite sides of said run, each of said chambers having wall means adjacent to the respective side of said conveyer and said wall means having nozzle means communicating with the respective chamber and with said space; a source of hot gases connected with said chambers for delivering hot gases through the respective nozzle means and against the respective sides of said conveyer so as to withdraw moisture from the batches of plastic material in said mold cavities and to transform the batches into shaped articles, the spent gases accumulating in said internal space; conduit means connected with said housing for returning spent gases from said internal space to said last mentioned source; and means located at the downstream side of said chambers for ejecting the shaped articles from said mold cavities so that the articles may be evacuated through said outlet means.

4. An apparatus for the production of briquette-like shaped articles from moisture-containing plastic materials of pulpy, slimy and like consistency, comprising a housing defining an internal space and having inlet and outlet means communicating with said space; and endless band conveyer mounted entirely within said housing and having a first side, a second side, at least one substantially vertical run, and a plurality of articulately connected elements defining material-receiving mold cavities, said cavities open at both sides of said conveyer and said substantially vertical run having a lower portion adjacent to said inlet means; means for driving said conveyer so that said elements advance upwardly along said run; a source of plastic material; means for consecutively transferring batches of plastic material from said source and through said inlet means into the mold cavities of said conveyer; means defining a pair of chambers located in said housing means at the opposite sides of said run, each of said chambers having wall means adjacent to the respective side of said conveyer and said wall means having nozzle means communicating with the respective chamber and with said space; a source of hot gases connected with said chambers for delivering hot gases through the respective nozzle means and against the respective sides of said conveyer so as to withdraw moisture from the batches of plastic material in said mold cavities and to transform the batches into shaped articles, the spent gases accumulating in said internal space; conduit means communicatively connecting the internal space of said housing with said last mentioned source; pump means mounted in said conduit means for returning spent gases from said internal space to said last mentioned source; and means located at the downstream side of said chambers for ejecting the shaped articles from said mold cavities so that the articles may be evacuated through said outlet means.

5. An apparatus as set forth in claim 4, wherein said source of hot gases is a gas burner and said pump means is a blower.

6. An apparatus as set forth in claim 4, wherein said housing comprises valve-controlled second outlet means communicating with said internal space for permitting evacuation of controlled quantities of spent gases from said housing.

7. An apparatus for the production of briquette-like shaped articles from moisture-containing plastic materials of pulpy and like consistency, comprising conveyor means movable along a predetermined path and defining material-receiving mold cavities; each of which has a pair of opposite open sides and includes an interior surface portion transverse to said sides; means for driving said conveyor means along said path; a source of plastic material; means for consecutively transferring batches of plastic material into the mold cavities of said conveyor means; means defining at least one chamber having apertured wall means adjacent to said conveyor means and located at the downstream side of said material transferring means; a source of hot gases connected to said chamber for delivering hot gases into said chamber and through said apertured wall means so that the gases contact the batches of plastic material at both of said open sides of each mold cavity to withdraw moisture from the batches of plastic material contained in the mold cavities and transform the batches into shaped articles, said interior surface portion of each cavity being located at a level below said open sides of the respective cavity at least when said cavity is in the region of said path adjacent said apertured wall means, each of said batches of plastic material being supported by said surface portions of the respective cavity at least while the same is in said region of said path; and means located at the downstream side of said chamber for ejecting the articles from said mold cavities.

8. An apparatus for the production of briquette-like shaped articles from moisture-containing plastic materials of pulpy and like consistency, comprising a housing defining an internal space and having inlet and outlet means communicating with said space; an endless conveyer mounted entirely within said housing and having a first side, a second side, and a plurality of articulately connected elements defining material-receiving mold cavities, said conveyer having a first and a second substantially vertical run; means for driving said conveyer so that said elements advance in upward direction along said first run and in downward direction along said second run, said inlet and outlet means respectively adjacent to the lower portions of said first and second runs; a source of plastic material; means for consecutively transferring batches of plastic material through said inlet means and into the mold cavities of said conveyer so that the batches thereupon advance along said first run; means defining a first and a second pair of chambers in said housing, the chambers of said first and second pairs respectively disposed at the opposite sides of said first and second runs, each of said chambers having apertured wall means adjacent to the respective run of said conveyer; a source of combustible gases connected with said second pair of chambers whereby the flames produced upon ignition of gases discharged through the wall means of said second pair of chambers impinge against the batches of plastic material advancing along said second run and produce hot combustion products which accumulate in said space; suction producing means connected with said space for withdrawing the combustion products from said housing; conduit means connected with said suction producing means for delivering combustion products to said first pair of chambers so that the combustion products discharged through the wall means of said first pair of chambers impinge against and withdraw moisture from the batches of plastic material advancing along said first run so as to transform the batches into shaped articles; and means located at the downstream side of said second pair of chambers for ejecting the shaped articles from said mold cavities so that the shaped articles may be evacuated through said outlet means.

9. An apparatus for the production of briquette-like shaped articles from moisture-containing plastic materials of pulpy and like consistency, comprising a housing defining an internal space and having inlet and outlet means communicating with said space; and endless conveyer mounted in said housing and having a first side, a second side, and a plurality of articulately connected elements defining material-receiving mold cavities, said conveyer having a first and a second substantially vertical run; means for driving said conveyer so that said elements advance in upward direction along said first run and in downward direction along said second run, said inlet and outlet means respectively adjacent to the lower portions of said first and second runs; a source of plastic material; means for consecutively transferring batches of plastic material through said inlet means and into the mold cavities of said conveyer so that the batches thereupon advance along said first run; means defining a first and a second pair of chambers in said housing, the chambers of said first and second pairs respectively disposed at the opposite sides of said first and second runs, each of said chambers having apertured wall means adjacent to the respective run of said conveyer; a source of combustible gases connected with said second pair of chambers whereby the flames produced upon ignition of gases discharged through the wall means of said second pair of chambers impinge against the batches of plastic material advancing along said second run and produce hot combustion products which accumulate in said space; suction producing means connected with said space for withdrawing the combustion products from said housing; conduit means connected with said suction producing means for delivering combustion products to said first pair of chambers so that the combustion products discharged through the wall means of said first pair of chambers impinge against and withdraw moisture from the batches of plastic material advancing along said first run so as to transform the batches into shaped articles; a pair of cooling chambers adjacent to the opposite sides of said second run and disposed at the downstream side of said second pair of chambers, said cooling chambers having apertured wall means adjacent to said second run; means for conveying coolant into said cooling chambers so that the coolant passes through said last mentioned wall means and cools the shaped articles; and means located at the downstream side of said cooling chambers for ejecting the cooled articles from said mold cavities so that the cooled articles may be evacuated through said outlet means.

10. An apparatus for the production of briquette-like shaped articles from moisture-containing plastic materials of pulpy and like consistency, comprising an endless band conveyer including a plurality of articulately connected elements defining material-receiving mold cavities having opposite open sides; means for driving said conveyor; a source of plastic material; means for consecutively transferring batches of plastic material into the mold cavities of said conveyor, said transferring means comprising guide shield means adjacent to said source and disposed at the opposite sides of said conveyor; housing means defining at least one chamber having apertured wall means adjacent to said conveyor and located at the downstream side of said material transferring means, said housing means completely enclosing said conveyor; means for guiding said conveyer past said apertured wall means with said opposite open side of said mold cavities located in at least substantially vertical direction a source of hot gases connected to said chamber for delivering hot gases into said chamber and through said apertured wall means so that the gases withdraw moisture from the batches of plastic material contained in the mold cavities and transform the batches into shaped articles; and means located at the downstream side of said chamber for ejecting the articles from said mold cavities.

11. An apparatus for the production of briquette-like shaped articles from moisture-containing plastic materials of pulpy and like consistency, comprising an endless band conveyer including a plurality of articulately connected grates defining within themselves material-receiving mold cavities having opposite open sides; means for driving said conveyer; a source of plastic material; means for consecutively transferring batches of plastic material into the mold cavities of said conveyer; housing means defining at least one chamber having apertured wall means adjacent to said conveyer and located at the downstream side of said material transferring means, said housing means completely enclosing said conveyer; means for guiding said conveyer past said apertured wall means with said opposite open side of said mold cavities located in at least substantially vertical direction a source of hot gases connected to said chamber for delivering hot gases into said chamber and through said apertured wall means so that the gases withdraw moisture from the batches of plastic material contained in the mold cavities and transform the batches into shaped articles; and means located at the downstream side of said chamber for ejecting the articles from said mold cavities.

12. An apparatus for the production of briquette-like shaped articles from moisture-containing plastic materials of pulpy and like consistency, comprising an endless band conveyer including a plurality of articulately connected substantially zig-zag shaped links defining between themselves material-receiving mold cavities having opposite open sides; means for driving said conveyer; a source of plastic material; means for consecutively transferring batches of plastic material into the mold cavities of said conveyer; housing means defining at least one chamber having apertured wall means adjacent to said conveyer and located at the downstream side of said material transferring means, said housing means completely enclosing said conveyer; means for guiding said conveyer past said apertured wall means with said opposite open side of said mold cavities located in at least substantially vertical direction a source of hot gases connected to said chamber for delivering hot gases into said chamber and through said apertured wall means so that the gases withdraw moisture from the batches of plastic material contained in the mold cavities and transform the batches into shaped articles; and means located at the downstream side of said chamber for ejecting the articles from said mold cavities.

13. An apparatus for the production of briquette-like shaped articles from moisture-containing plastic materials of pulpy and like consistency, comprising an endless band conveyer including a plurality of articulately connected elements defining material-receiving mold cavities having opposite open sides; means for driving said conveyer; a source of plastic material; means for consecutively transferring batches of plastic material into the mold cavities of said conveyer; housing means defining at least one chamber having apertured wall means adjacent to said conveyer and located at the downstream side of said material transferring means, said housing means completely enclosing said conveyer; means for guiding said conveyer past said apertured wall means with said opposite open side of said mold cavities located in at least substantially vertical direction a source of hot gases connected to said chamber for delivering hot gases into said chamber and through said apertured wall means so that the gases withdraw moisture from the batches of plastic material contained in the mold cavities and transform the batches into shaped articles; means defining at least one second chamber at the downstream side of said first mentioned chamber, said second chamber having apertured wall means adjacent to said conveyer; means for conveying coolant into said second chamber so that the coolant is discharged through said last mentioned wall means and cools the shaped articles; and means located at the downstream side of said second chamber for ejecting the articles from said mold cavities.

References Cited by the Examiner

UNITED STATES PATENTS

| | | | |
|---|---|---|---|
| 1,419,147 | 6/1922 | Kloepping | 18—9 |
| 1,744,884 | 1/1930 | Griener | 18—1 XR |
| 1,751,430 | 11/1930 | Thompson | 28—97 XR |
| 2,038,251 | 4/1936 | Vogt | 264—15 |
| 2,128,827 | 8/1938 | Killian | 18—4 XR |
| 2,294,476 | 9/1942 | Mooney | 18—26 XR |
| 2,413,735 | 1/1947 | Shabaker | 18—1 XR |
| 2,813,299 | 11/1957 | Massey | 18—1 |
| 2,948,019 | 8/1960 | Petersen | 18—4 XR |
| 2,957,200 | 10/1960 | Pufahl | 18—9 |
| 3,078,518 | 2/1963 | Robinson | 264—15 |

FOREIGN PATENTS 480,491  8/1929  Germany.

WILLIAM J. STEPHENSON, *Primary Examiner.*

ALEXANDER H. BRODMERKEL, *Examiner.*

R. B. MOFFITT, *Assistant Examiner.*